June 1, 1943.  J. KIRCHHOF  2,320,613
LOCOMOTIVE VALVE ACTUATING MECHANISM
Filed July 1, 1939  6 Sheets-Sheet 1

INVENTOR
Julius Kirchhof
BY
Synnestvedt & Lechner
ATTORNEYS

June 1, 1943.  J. KIRCHHOF  2,320,613
LOCOMOTIVE VALVE ACTUATING MECHANISM
Filed July 1, 1939  6 Sheets-Sheet 3

INVENTOR
Julius Kirchhof
BY
Symmestedt & Lechner
ATTORNEYS

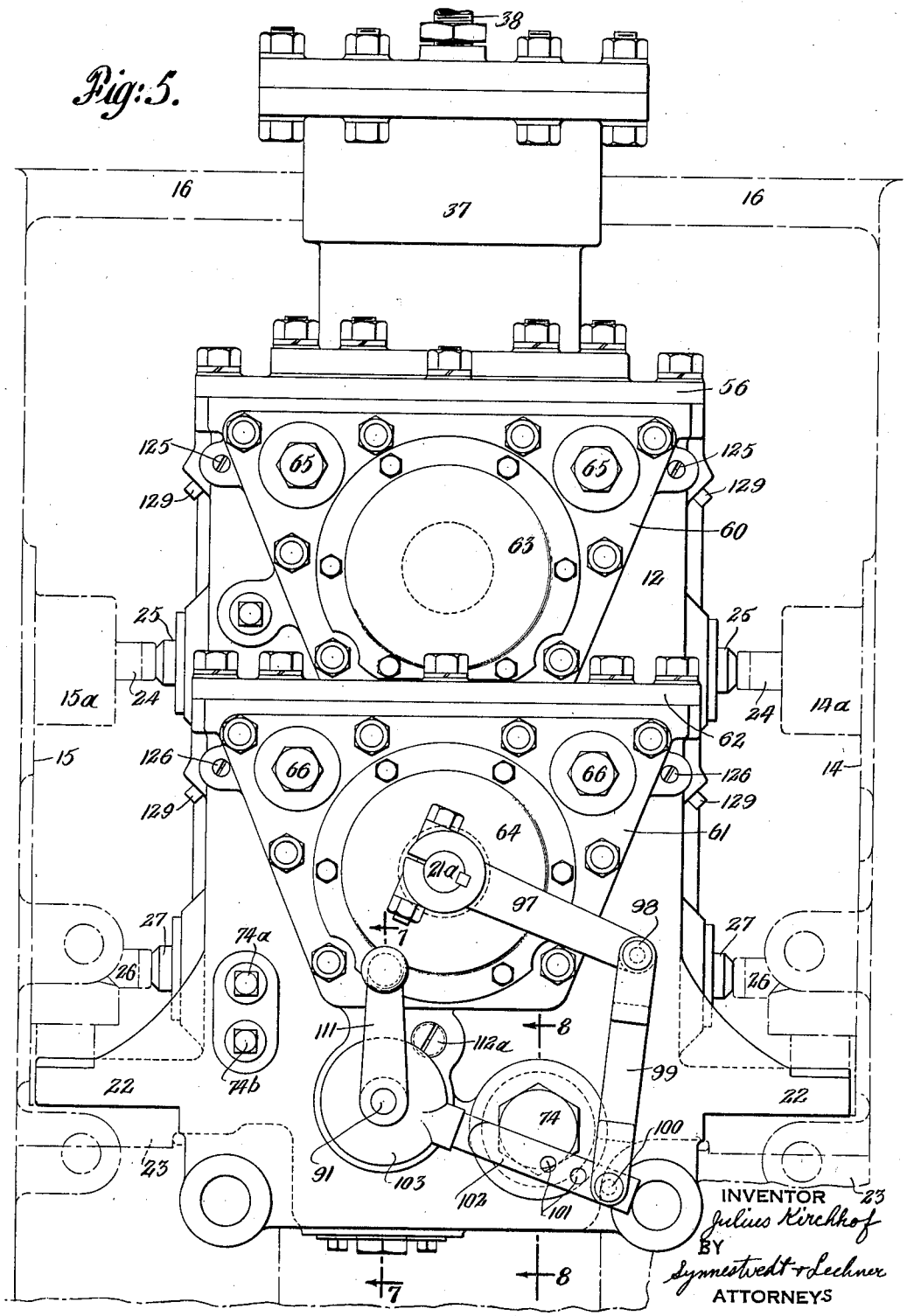

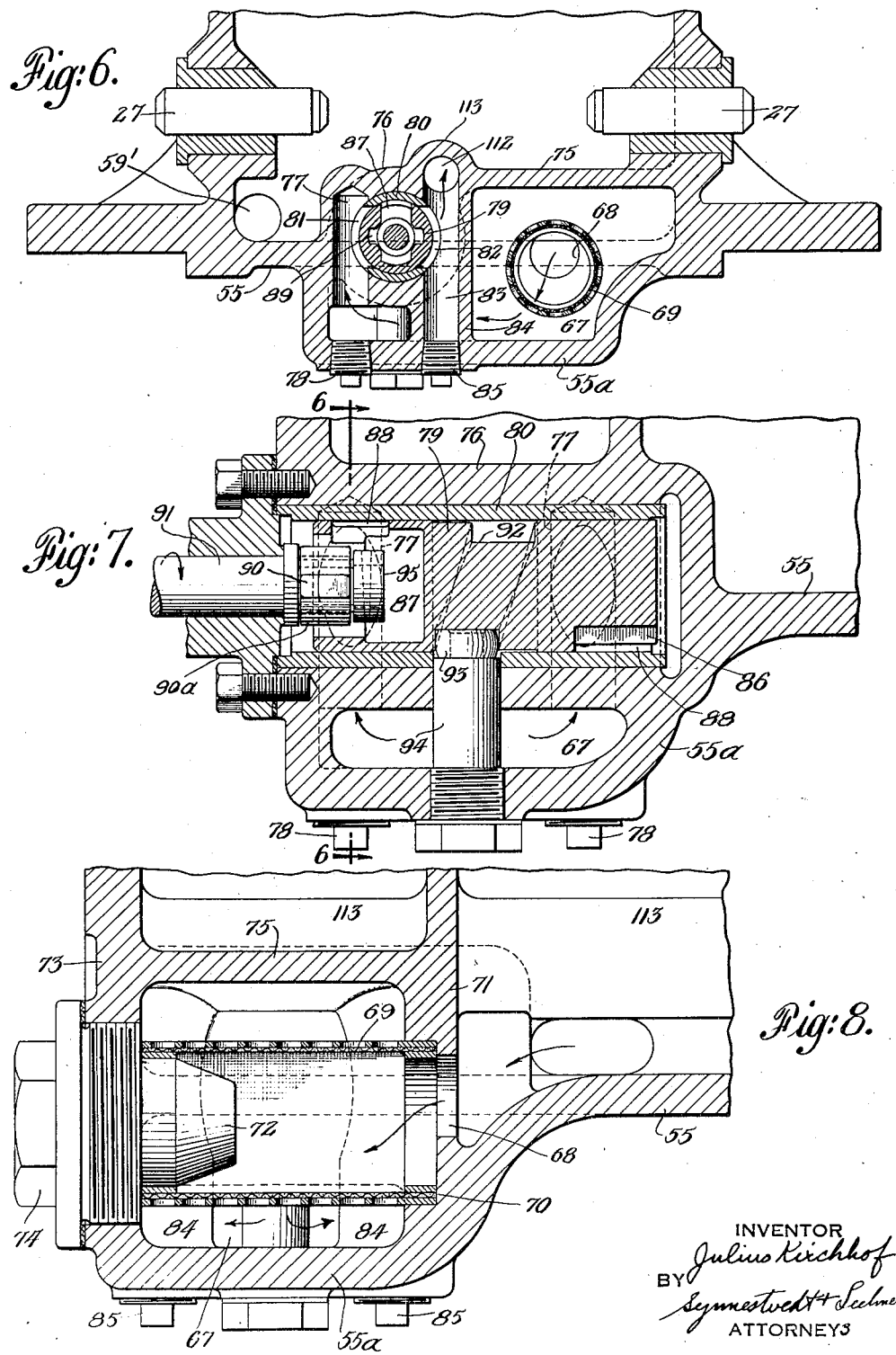

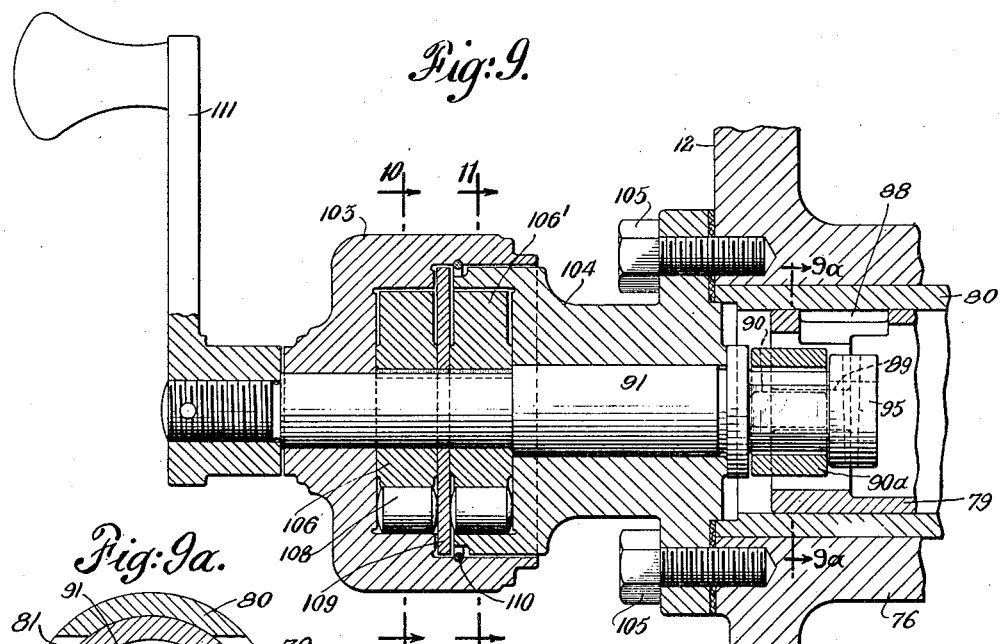
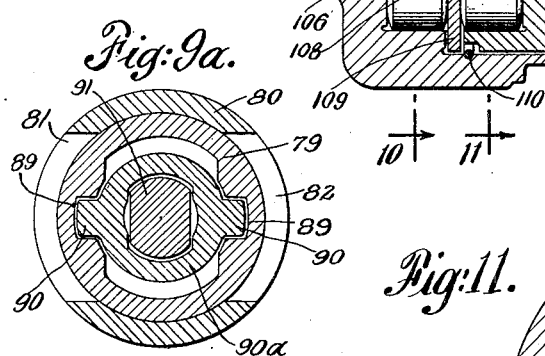
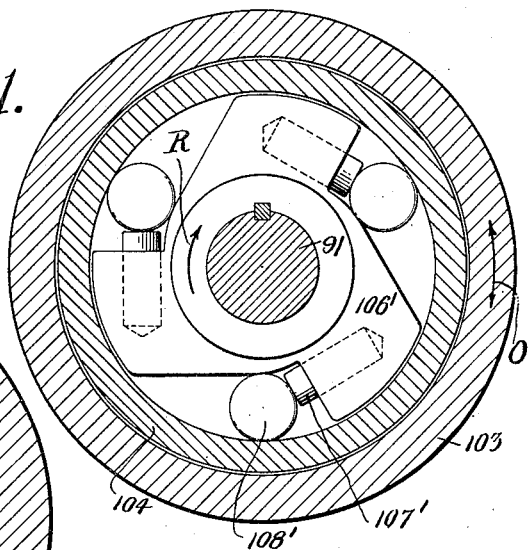
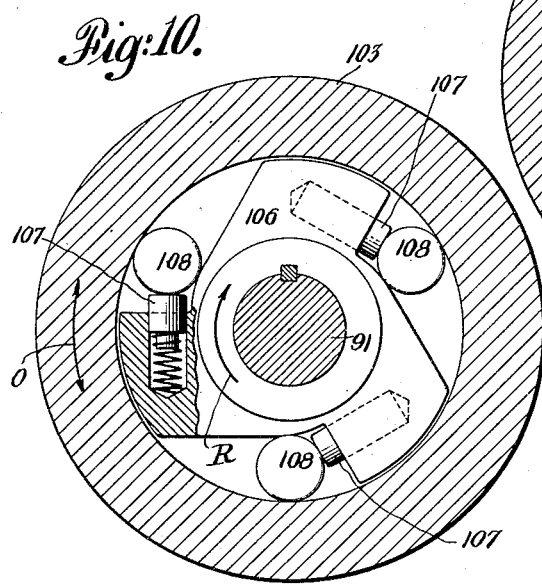

Patented June 1, 1943

2,320,613

UNITED STATES PATENT OFFICE 2,320,613

LOCOMOTIVE VALVE ACTUATING MECHANISM

Julius Kirchhof, Baltimore, Md.; vested in the Alien Property Custodian

Application July 1, 1939, Serial No. 282,338

14 Claims. (Cl. 184—6)

This invention relates to locomotive valve actuating mechanism, and more particularly to certain novel features thereof relating to the lubrication of the mechanism.

Although some aspects of the invention may be applicable to other forms of mechanism, and to that extent not limited to the mechanism herein disclosed, the invention is peculiarly applicable to and advantageous in a locomotive valve actuating mechanism of the character now to be described.

In a locomotive having for each cylinder a pair of valve chests, one at each end of the cylinder, containing poppet valves or the like arranged in multiple, with their stems projecting from the chests toward the central region between the two chests, it is desirable to actuate the valves in both chests by means of a plurality of cams and associated parts which are located in a common enclosure or box which is mounted on top of the cylinder in a position between the two valve chests. The location and mounting of such a cam box or casing is disclosed in my copending United States patent application Serial No. 217,890, filed July 7, 1938, which may be referred to for a full explanation of the purposes and advantages of such an arrangement. However, as a convenient aid to the full understanding of the objects and advantages of the present invention, such construction should be briefly described herein, as follows:

The seating of the cam box upon the cylinder between the two chests (especially in installations wherein steam pipes and other locomotive parts overlie the cam box, and the cylinder saddle and also the driving connections from the adjustable valve gear to the cam shafts utilize the space at the inner end of the cam box) results in such an arrangement that access to the cam box is had chiefly from the outer end thereof.

It is one of the purposes of the present invention to increase the accessibility of the lubricating mechanism for the moving parts in the cam box, and to do this while retaining ready accessibility to the parts which are to be lubricated, and to accomplish these objects particularly in a mechanism of the general character briefly described above.

Another important purpose of the invention is to make more certain the positive and reliable lubrication of the moving parts in the cam box, especially in installations of the multiple valve type, wherein the valves and valve stems are arranged in superimposed pairs, the upper pair of which is actuated from one cam shaft and the lower pair of which is actuated from another cam shaft; both shafts, with their associated parts, being housed within a common casing, which is thus of appreciable vertical height. In such an arrangement, it has heretofore been proposed to lubricate the parts either by an externally located pump or by oil cups, or else by a bath of oil contained within the cam box.

Lubrication of such a mechanism by an oil bath has the disadvantage of being lacking in certainty and safety; for in order to avoid oil losses the oil level must be kept below any of the operating shafts which extend through the external walls of the box, on account of which the lubrication of the moving parts in the upper part of the box is not assured. In addition, unless the oil is changed very frequently and the cam box frequently flushed out, dirt, grit, sand and the like will accumulate and will be carried to the parts which are to be lubricated, thus hastening the wear of such parts. On the other hand, if external lubricating devices are employed, oil pipes passing from the outside to the inside of the box are necessary, and these on account of their small size are subject to breakage, and also result in restricting the quantity of oil which can be fed to the parts. The cam box with such mechanism must also be drained frequently. It is thus a further object of my invention to eliminate such expedients, and thus to avoid their attendant problems and disadvantages.

A further object of the invention is to secure automatically a forced circulation of oil at a rate which varies in a desirable ratio with the variation in operating speed of the parts in the cam box, particularly in proportion to the rate of oscillation of the parts in an installation employing the oscillating or rocking type of cams, and further to render the rate of feed readily adjustable at will, by means of adjustments which are easily accessible from the outer end of the cam box, without disturbing any of the internal parts.

The invention also contemplates securing the most desirable distribution of feed to different parts of the mechanism, from a single pump; also an adjustability in the relative distribution of oil to different parts, which is advantageous per se, and is further of especial advantage when employed in conjunction with an adjustable pump feed rate.

Still further, the invention contemplates certain special advantages in an installation of the type briefly described hereinabove, wherein one cam shaft actuates the admission valves and the other cam shaft actuates the exhaust valves. In such a mechanism, the two shafts may be oscillated in an independent manner, and undergo variations in their relative timing and amplitudes of oscillation, for instance when they are oscillated by a valve motion mechanism of the type shown, for example, in the co-pending application of William E. Woodard, Serial No. 256,874, filed February 17, 1939. With such independent oscillation of the admission and exhaust cam shafts, one shaft, e. g., the exhaust cam shaft, may still have a substantial amplitude of oscillation during periods of locomotive operation when the other shaft is receiving a lesser oscillation, as, for example, when the locomotive is operating at or close to minimum cut-off adjustment of the valve gear. At such times, with the admission cam shaft receiving its minimum amplitude of oscillation, the locomotive may be running at high speed, thus still requiring ample lubrication of the moving parts in the cam box. In such an installation the present invention contemplates the application of an oil pump, preferably located inside the cam box, and driven from one of the oscillating parts which, under all conditions of adjustment of the valve gear, has a substantial amplitude of oscillation, notably the exhaust cam shaft. Such an operating connection to the pump may thus be made a substantially direct one, without necessitating any substantial motion-multiplying mechanism.

Regardless of the type of valve motion which actuates the mechanism in the cam box, there is another condition which the present invention is designed to meet, namely: when the locomotive stands idle, the oil on the moving parts in the upper portion of the cam box drips down, and such parts may, after a time, have less than the minimum amount of oil which they require to prevent wear or scoring. In accordance with the present invention, this difficulty is met by providing a manually operated device, accessible from the outer end of the cam box, and preferably constituting a part of or associated with the driving connection from the cam shaft to the oil pump, by means of which device the pump may be manually rotated, to effect a lubrication of the parts prior to starting up of the locomotive after a period of idleness.

The invention further contemplates the utilization of a rotary pump driven from an oscillating member, through a free-wheeling device, which latter device is also preferably made use of as a means to permit the manual rotation of the pump regardless of the momentary position of the oscillating member which normally drives it.

Still more specifically, the invention contemplates a cam box mechanism for operating locomotive valves, as hereinabove set forth, wherein, although the actuating and adjusting connections for the pump are readily accessible from the outside of the box, the lubricating conduits, as well as the strainer, collecting sump, and pump, are housed within the box; the conduits being preferably formed for the most part directly in the cam box walls, for example, by drilling the oil passages within ribs or bosses which are cast integrally with the casing.

The invention further involves the formation of an oil collecting sump in the bottom of the cam box; the housing of strainer and pump units in said box, with the strainer at the inlet to the sump and the pump at the outlet thereof, while rendering each of said units readily removable endwise from the box; and the provision of removable plugs for cleaning out the various portions of the system, including the pocket where foreign matter is collected by said strainer, and also the location of oil level plugs for access from the outer end of the box.

How the foregoing objects and advantages are secured, together with such others as are incident to the invention, will be evident from the following description taken together with the accompanying drawings which will now be referred to.

Figure 5 is an outer end elevational view of the cam box of Figure 1, showing portions of the locomotive structure in dot-and-dash lines;

Figure 6 is a fragmentary section, to a larger scale, taken through the oil sump and oil pump and associated parts, on the line 6—6 of Figure 7;

Figure 7 is a fragmentary transverse section, on a still larger scale, taken on the line 7—7 of Figure 5;

Figure 8 is a fragmentary section on the scale of Figure 7, taken on the line 8—8 of Figure 5;

Figure 9 is a fragmentary view, chiefly in section, to a still larger scale, taken about on the plane of Figure 7, but showing particularly certain parts located outside the cam box, notably the over-running clutch, and the manual actuating device;

Figure 9a is a section through the slidable driving connection for the pump, taken about on the line 9a—9a of Figure 9;

Figure 10 is a further enlarged sectional view, taken on the line 10—10 of Figure 9, with certain parts shown in elevation; and Figure 11 is a similar view taken on the line 11—11 of Figure 9.

Figure 1:
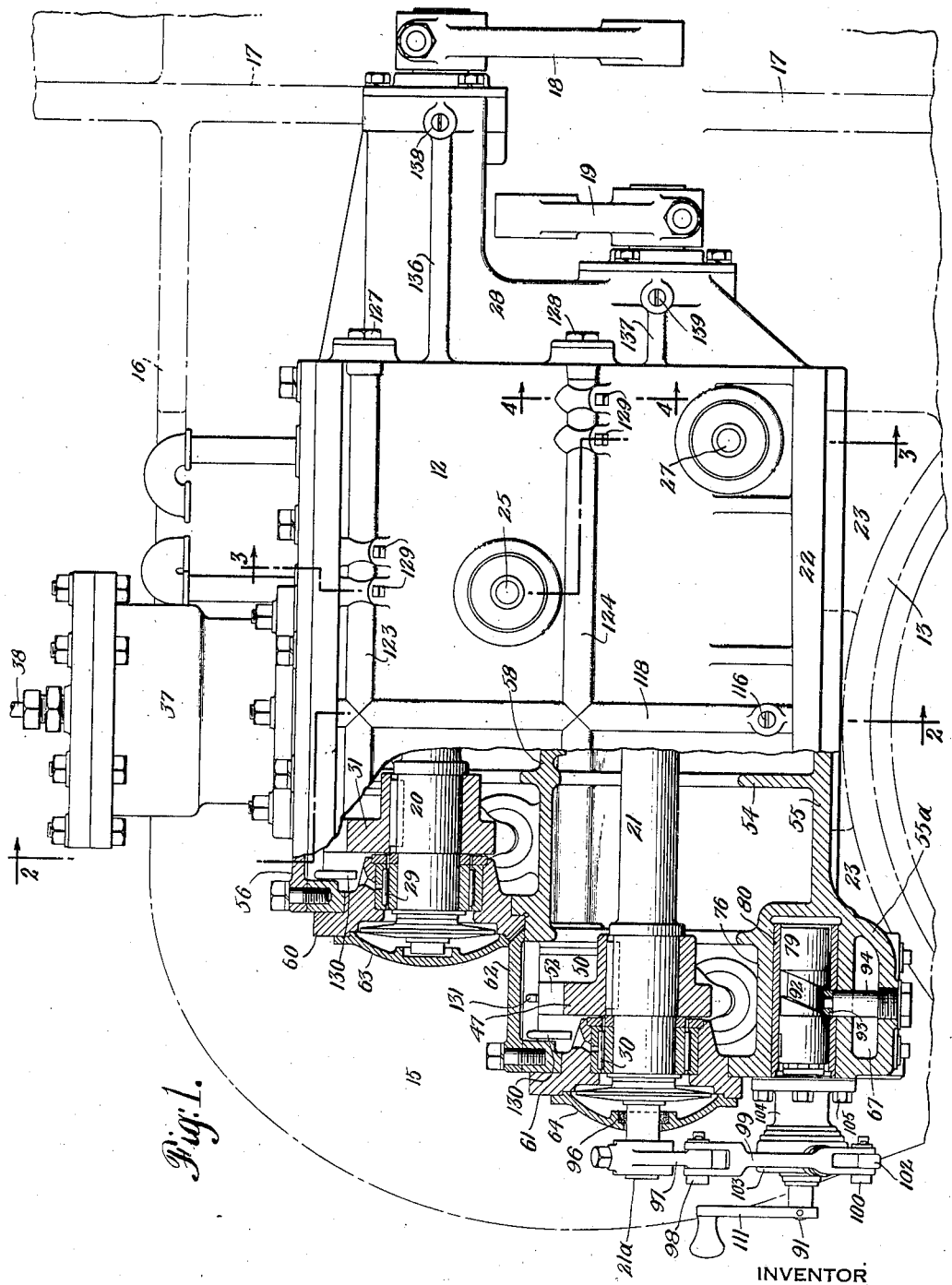
Figure 1 is a front elevational view of a cam box and associated mechanism, illustrating in dot-and-dash lines the locomotive structure with which it is associated, with parts broken away and parts in section, showing an embodiment of the present invention.

By reference first to Figures 1 and 5, it will be observed that the cam box 12 is positioned on top of the locomotive cylinder 13, between the front and back valve chests 14 and 15, there being bracing structure 16 overlying the cam box and interconnecting the front and back valve chest castings. Said chests may be formed as an integral casting with the cylinder and with the cylinder saddle structure 17, and may extend upwards some distance, as shown, in order to incorporate exhaust passages or the like.

In addition to the surrounding structure just described, steam piping (not shown) would normally be located above the cam box 12; and such surroundings, as well as the connections from the valve gear (not shown) to the actuating arms 18 and 19 on the admission and exhaust cam shafts 20 and 21, respectively, leave the cam box 12 accessible chiefly from its outer end (the left hand end in Figure 1, which is the face of the mechanism as seen in Figure 5).

The mounting of the cam box may be by means of suitable flanges 22, which are seated upon pads 23 on top of the cylinder 13. This mounting is not a part of the present invention but is claimed in my copending application above referred to.

The steam admission valves are located in pairs in each chest, the stems 24 thereof being supported by guides 14a and 15a, and extending toward the chest interspace for actuation by the valve tappets 25 which extend out of the front and back walls of the cam box 12. Likewise, the exhaust valve stems 26 are in operative registry with the tappets 27, these being located below the level of the corresponding admission valve parts.

At its inner end, the cam box has an extending bracket structure 28 which internally carries anti-friction bearings for the support of the shafts 20 and 21. Adjacent the outer end of the box (as seen in Figure 1) similar anti-friction bearings 29, 30, are shown.

The actuation of the admission valve tappets 25 from the oscillating cam shaft 20 is as follows: said shaft carries a pair of cams 31 (one being shown in Figure 1 and the other being shown in the sectional view of Figure 3). Each cam is in registry with a pair of rollers 32, each roller being mounted by a pin 33 in a bifurcated intermediate lever 34, such lever at its upper end being mounted for free rotation on a shaft 35 and having at its lower end a depending portion 36 which joins the two prongs of the bifurcated lever and hangs in a position to engage the inner end of a valve tappet 25.

Figure 2:
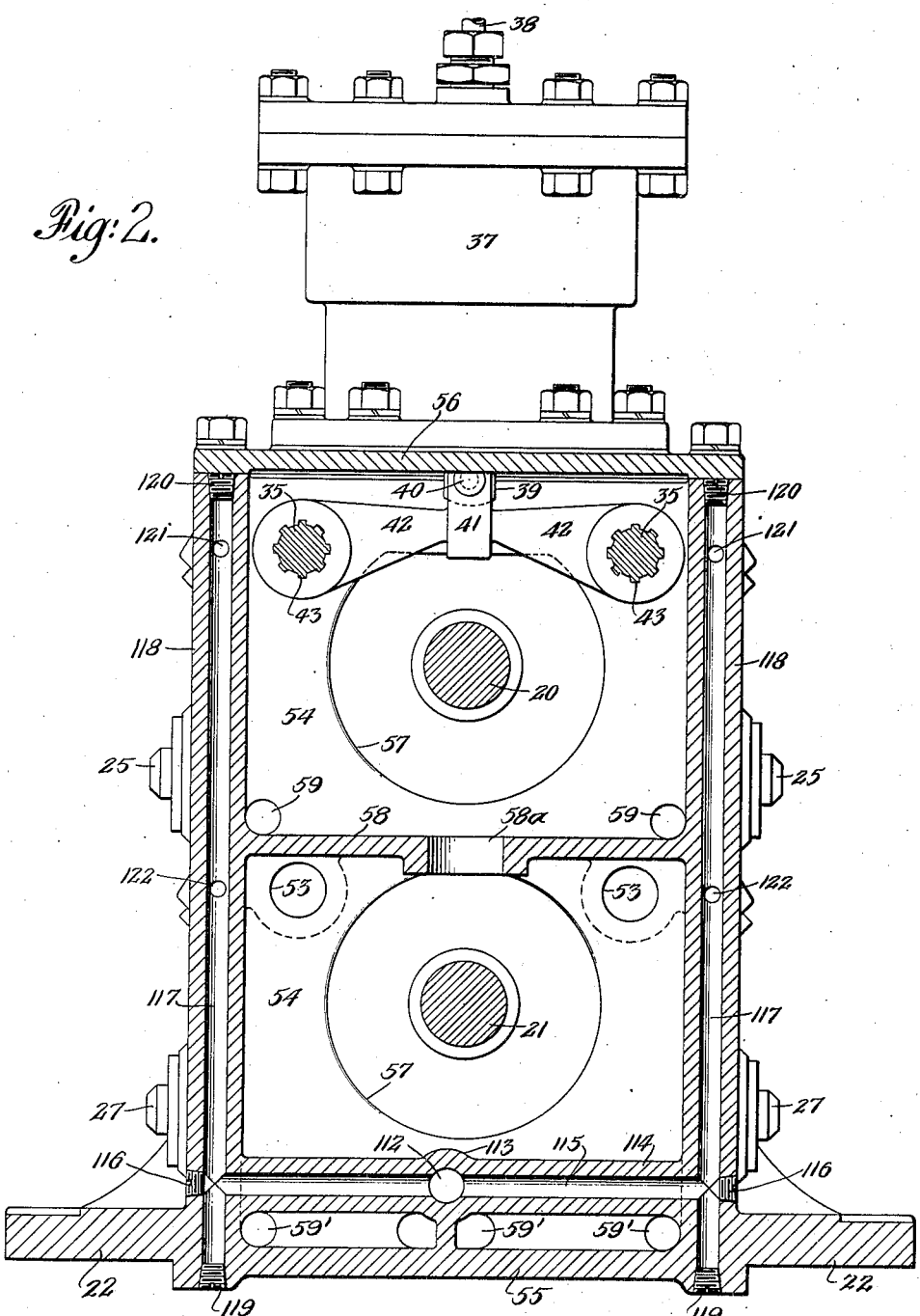
Figure 2 is an irregular section through the cam box mechanism of Figure 1, taken approximately on the line 2—2 of that figure, but to a larger scale, and omitting certain of the working parts.

For "drifting" operation of the locomotive (as described more fully in the aforementioned copending application of William E. Woodard) the levers 34 may be swung outwardly until their rollers 32 are out of the path of movement of the cam lobe 31, under which condition the admission valves, by means of the tappets 25, are held wide open. To so swing the levers and rollers out of the path of the cams, there is provided a cylinder 37, to which a fluid under pressure may be delivered through a pipe 38, which forces downwardly a piston (not shown) in said cylinder, the stem 39 of which is coupled at 40 to a yoke 41, which engages a pair of arms 42, each splined at 43 on one of the shafts 35 (as shown in Figure 2). Also splined on said shafts are a group of collars 44, one for each intermediate lever 34, positioned between the branches of said lever, and carrying projecting striker arms 45 which extend axially of said shafts each a sufficient distance to overlie an abutment 46 formed on a branch of the lever 34. Thus these abutments swing the levers outwardly, each about the axis of its shaft 35 as a pivot, upon actuation of the mechanism just described, by means of the pressure fluid admitted through pipe 38.

On the exhaust cam shaft 21 is a pair of exhaust cams 47 (one shown in Figure 1 and the other shown in Figure 3), the same being keyed thereon to oscillate therewith. These are adapted to actuate the exhaust valve tappets 27 and thus the exhaust valves, by means of rollers 48 mounted by pins 49 on intermediate levers 50 which are pivoted on fulcrum shafts 51. Spacer collars 52 are located between the jaws of the forked levers 50. The general arrangement of the exhaust actuating parts will thus be seen to be similar to the admission actuating parts, although no arrangement for swinging the exhaust parts away from the part of the exhaust cams 47 need be employed, since it is only essential for drifting purposes that one set of valves should be held open.

The support of the admission lever fulcrum shafts 35 is not shown, but it may be similar to that for the exhaust lever fulcrum shafts 51, the latter being carried in reinforced apertures 53 (see Figure 2) located in the internal vertical strengthening webs 54 of the casing. These webs, as will be seen from Figures 1 and 2, extend from wall to wall of the box, and from the floor 55 thereof upwardly to adjacent the top cover plate 56, but have upper and lower apertures 57 to provide for passage of the cams therethrough when the cam shafts 20 and 21 are pulled out or inserted from the end of the cam box. (The cams, cam rollers, etc., are omitted from Figure 2.)

Figure 3:
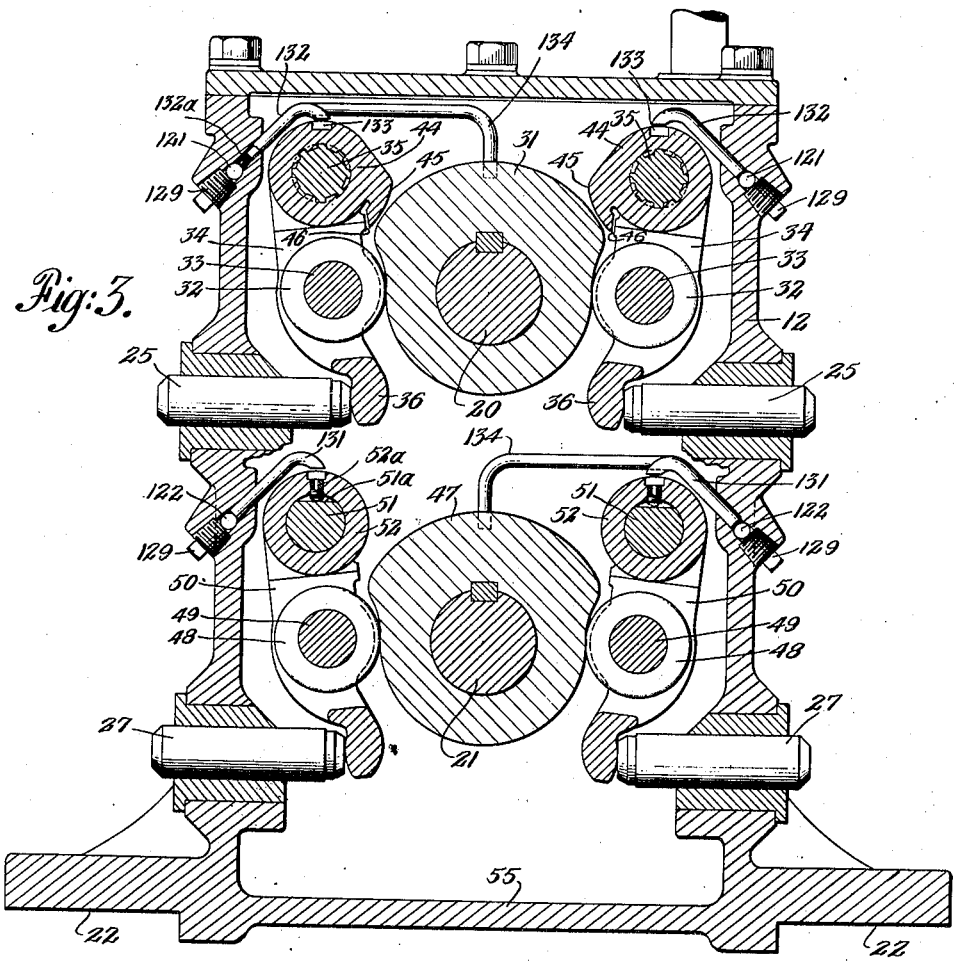
Figure 3 is an irregular section taken about on the line 3—3 of Figure 1.

There is also preferably provided a horizontal stiffening web 58 (seen in Figures 1 and 2), which, however, terminates in the mid-region of the cam box, so that at the region illustrated in Figure 3 there is a clear space from the top to the bottom of the box. Lubricant fed to the moving parts in the upper outer end of the box finds its way back into the lower portion of the box by passing through the apertures 59 in the webbing 54, and thence dropping down to the rear portion of the box (at the general plane of Figure 3). Apertures 58a may also be provided in the cross web 58, as shown in Figure 2, for return of oil to the lower part of the cam box.

The major structure of the cam box itself is completed by the outer end cover plates 60 and 61 (Figures 1 and 5) and the intermediate horizontal cover plate 62. The plates 60 and 61 not only serve as removable supports for the bearings 29 and 30, but when removed they also permit of the endwise withdrawal of the cam shaft assemblies. These plates may also have separately removable cap plates 63 and 64, which cover openings through which inspection of the bearings may be had. Separately removable plugs 65 and 66 are also provided, to give access respectively to the lever fulcrum shafts 35 and 51.

From the foregoing it will be seen that the internal working parts of the valve actuating mechanism in the box are readily accessible from the outer end of the box. This accessibility is preserved, while at the same time the lubricating system is also rendered easily accessible, by the arrangement of the parts thereof, which will now be described.

By reference to Figures 1, 6, 7 and 8, it will be seen that the bottom 55 of the box, adjacent the outer end, extends downwardly at 55a to form an oil sump 67. Apertures 59' in the webbing 54 (Figure 2) permit returning oil, which has dripped down from the moving parts, to flow freely along the floor 55, from whence the oil passes through an aperture 68 (see Figures 6 and 8) into the cylindrical strainer 69, and thence through the meshes of said strainer into the sump 67, as indicated by the arrows. The strainer is positioned by an annular shoulder 70 formed in the partition wall 71, and by a plug member 72 which is threaded into the outer wall 73 and has a hex head 74 whereby it may be unscrewed for cleanout purposes and for replacement of the strainer. Oil level indicating means, such as a gauge, or upper and lower oil level plugs 74a and 74b, are provided; these being located in the outer end of the wall of the box, as shown in Figure 5.

The top of the sump is formed by an internal horizontal partition 75, which is integrally joined with the cylindrical housing 76 for the oil pump. Two vertical bores are made through the bottom floor 55a of the sump, and thence upwardly, as shown at 77, in a side portion of the pump cylinder. The two holes thus formed in the floor 55a are closed by the two plugs 78, 78. The rotatable pump body 79 is mounted in its cylindrical shell 76 by means of a cylindrical bushing 80, which has a pair of apertures 81, one in communication with each of the bores 77, the bottom ends of the bores 77 being in free communication with the bottom of the sump 67.

Diametrically opposite from the inlet apertures or ports 81, the pump bushing 80 has a pair of outlet apertures or ports 82, each of which communicates with a delivery bore 83, the two delivery bores being drilled in a pair of upstanding columns 84 formed integrally with the rest of the casing structure. The bottom ends of the bores 83 are closed by plugs 85, 85. Before considering the oil distributing system, attention will now be directed to the pump itself, and the actuation thereof from the exhaust cam shaft 21.

Although other forms of pumps may be used, the particular one illustrated is of the double-ended piston type (see Figures 1, 6 and 7). At each end, the pump member 79 has an oil pocket or chamber, 86, at the inner end and 87 at the outer end, each having a peripheral opening or slot 88 as shown. At its outer end, the pump member has grooves 89, adapted for sliding engagement with the driving lugs 90 (see also Figures 9 and 9a) of an Oldham or other type of flexible coupling 90a which is slidably fitted on the flattened end of the rotatable actuating shaft 91.

Thus, as the shaft 91 is turned, the pump member 79 turns with it, any slight disalignment being accommodated by the coupling. Intermediate its ends, the pump member has a peripheral groove 92 (see Figures 1 and 7) the general plane of which is disposed at an oblique angle with relation to the pump axis. This groove is in engagement with a roller 93 mounted on the upper end of a stud 94, which is screwed into the assembly from the bottom of the sump. The member 94 thus serves as a clean-out plug for the sump 67, and in addition it acts to cause a reciprocation of the pump as the pump rotates.

From the foregoing it will now be readily seen that the two pump intake openings 88 (which are positioned 180° from each other around the periphery) will alternately come into communication each with its own oil intake passage 77, during rotation of the pump member 79. They will also alternately come into communication each with one of the oil discharge passages 83. Owing to the reciprocation of the pump member, as it rotates, the oil pockets 86 and 87 will alternately draw in the oil through the associated intake openings, and thereafter force out the oil through the associated discharge passages. The reciprocation of the pump member 79 with reference to the actuating ribs or lugs 90 is, of course, accommodated by relative axial sliding, and in addition it will be noted that the pump cavity 87 is enlarged to accommodate the clamping collar 95 which is keyed on the inner end of the actuating shaft 91 to hold the coupling member 90a on the end of the shaft.

The rotating motion of the pump is derived from the oscillating motion of the exhaust cam shaft 21, through the intermediation of the mechanism now to be described.

By reference now to Figures 1, 5, 9, 10 and 11, it will be seen that the exhaust cam shaft 21 has an external extension 21a, passing out through the cap member 64, which has an oil seal 96. Keyed on the shaft extension 21a is an arm 97, pivotally coupled at 98 to link 99, which in turn is adjustably pivoted at 100 to one of the holes 101 in an arm 102 which is fixed on a cylindrical cap member 103, rotatably mounted on the shaft 91.

As shown in Figure 9, the cup-shaped cap member 103, which is oscillated by the exhaust cam shaft 21 through the linkage 97, 99, 102, is journalled on the outer part of shaft 91 and loosely telescopes the sleeve-like bracket 104 which is secured by studs 105 to the cam box 12 and serves to journal the shaft 91. Removal of the studs 105 and member 104 permits endwise withdrawal of the pump unit.

Within the member 103 and within an enlargement of the member 104 are over-running clutches, shown respectively in Figures 10 and 11.

The first clutch comprises a spider 106 keyed on shaft 91 and carrying spring-pressed plungers 107 which urge the rollers 108 in a direction to wedge them between the tangentially-extending arms of the spider and the inner surface of member 103. As the latter is oscillated back and forth (indicated by the double-ended arrow 0) it imparts intermittent impulses, through the over-running clutch, to the shaft 91 in the direction of rotation R.

The other clutch comprises a similar spider 106', spring-actuated plungers 107', and rollers 108', but the latter act on the inner periphery of the fixed sleeve 104. This is to prevent back-up of the shaft 91 during the alternating oscillations of the parts which drive it. The two clutch units are separated and their parts kept in proper position by a spacer disc 109, which in turn is retained in the cup member 103 by a snap-ring 110.

From the foregoing it will be quite apparent how the oscillating motion of the cam shaft gives a unidirectional (though intermittent) rotation to the pump; and since this motion is derived from the exhaust cam shaft, which is designed or intended to have the greatest average amplitude of motion of the parts in the box, under varying adjustments of the valve gear, the pump receives enough movement to give adequate lubrication of all parts under all running conditions.

For effecting circulation before starting up, after a period of idleness, the outer end of pump shaft 91 carries a hand crank 111. The freewheel devices are so oriented as to permit free turning of this crank under all conditions. The manual and automatic actuating devices for the pump shaft, as well as the means of adjustment for the latter device, are located for ready external access from the outer end of the box, without disturbing any other parts, even though the pump itself is in the most effective, and most protected position, i. e., inside the box. Similarly, the pump unit itself, as well as the strainer unit, can be withdrawn endwise through the outer wall of the box; and any dirt in the system will be prevented by the strainer from reaching the pump, and the accumulated dirt in the strainer can be easily cleaned out, from the outer end of the box.

Turning now to the distribution system, it will be seen from Figures 6 and 8 that the vertical discharge conduits 83 from the pump deliver into a horizontal passage 112 bored in the integral cylindrical rib structure 113 which extends inwardly in the box to the plane of the transverse rib 114 (Figure 2). The closure plug 112a for passage 112 is seen in Figure 5. The transverse rib 114 is bored to form an oil passage 115, the ends of which are closed by plugs 116 at the front and back faces of the cam box (see Figures 1 and 2).

The transverse feed passage 115 in turn communicates with two vertical passages 117, which are bored in vertical bosses or ribs 118, cast integrally with the walls of the box 12. The lower ends of the bores 117 are closed by the plugs 119, and the upper ends by the plugs 120.

Each vertical bore 117 in turn communicates with an upper and a lower horizontal bore, 121 and 122 respectively, formed in the ribs 123 and 124 which are cast integrally with the box. The ends of the bores 121 and 122 are closed by the outer clean-out plugs 125 and 126 (see Figure 5), and by plugs at their inner ends, shown at 127, 128 in Figure 1.

It will be observed that there is a progressive reduction in diameter of the various oil passages, from the relatively large diameter of the main oil delivery passages 83 and 112, down to the relatively small diameter of the branch passages 121 and 122; which of course is designed to aid in giving the proper division and distribution of the oil delivered by the pump.

Figure 4:
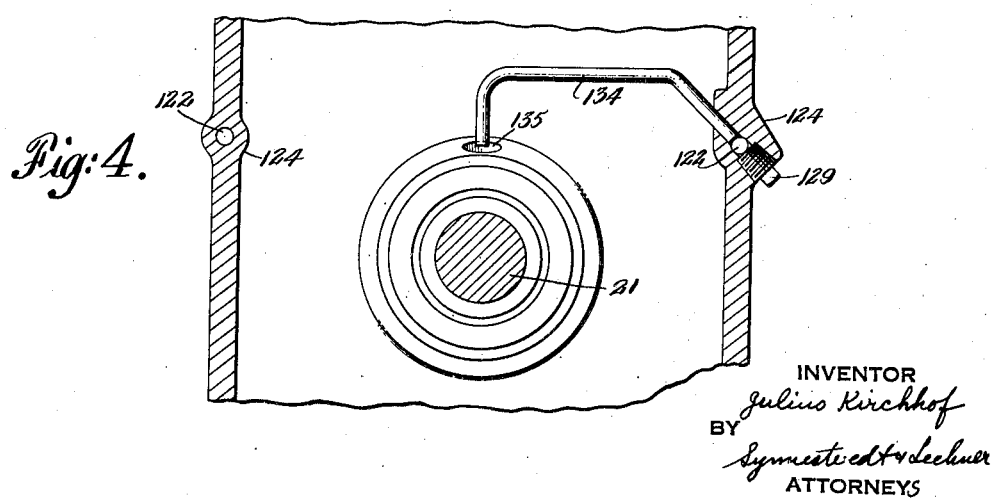
Figure 4 is a detail, in section, taken on the line 4—4 of Figure 1.

The ultimate delivery of the oil to the moving parts in the box is by means of the small tubes seen in Figures 1, 3 and 4, which are fitted into outlet bores communicating with the horizontal bores 121 and 122, the various discharge tube bores being externally closed by plugs 129.

Discharge tubes 130 (Figure 1) feed oil to the bearings 29 and 30, through the holes (shown) in the bearing races and bearing supports. Tubes 131 (Figures 1 and 3) deliver oil to feed screws 52a which also act as set screws to hold the spacing collars 52 in fixed position with respect to the fulcrum shafts 51 for the forked intermediate rocking levers 50 which carry the exhaust cam rollers 48. The oil flows along the flattened face 51a of each shaft 51, and thus reaches the inner faces of the two prongs or arms of the bifurcated lever 50, thereby lubricating the pivotal mounting of said levers on the shafts 51 and also lubricating the rollers 48 with respect to their pivots 49, and also the contacting face of each roller with the cam, as well as the contact of the lever with the valve tappet 27, and hence the tappet itself.

Tubes 132 (Figure 3) deliver oil to the longitudinal slots 133 extending along the upper periphery of the collars 44, from whence the oil reaches the inner faces of the two prongs of the admission intermediate levers 34, to lubricate said levers, their cam rollers 32, the admission cam, the contact surface between the parts 36 and the tappets 25, and finally the admission valve tappets themselves.

Tubes 134 (Figures 3 and 4) lubricate cam shaft bearings adjacent the inner ends of the box 12, the final delivery thereto being through oil holes 135, as best seen in Figure 4. Extension ribs 136 and 137 (see Figure 1) may be bored to carry oil from the bearings just mentioned, inwardly along the bracket structure 28, to radial bores (closed by the plugs 138, 139), which feed to bearings (not shown) adjacent the innermost ends of the two cam shafts.

Each of the final distributing tubes may be provided with an oil metering, or distribution adjusting, plug, such as shown at 132a, in Figure 3. It will be readily seen that by substituting different metering plugs, having different sized orifices, in the several oil discharge tubes 130, 131, 132 and 134, the proper amount of oil to be delivered to each moving part can be quite accurately fixed, especially when these are employed in conjunction with an adjustable pump such as is used herein.

From the above description it will be evident that all moving parts in and associated with the cam box are directly and thoroughly lubricated, through a system of oil passages which is completely enclosed within the box, most of said passages being bored within integral bosses, ribs, and the like formed in the cam box casting. The oil fed to all the moving parts drips and flows down inside the box, passes through strainer 69, and collects in the sump 67, from whence it is picked up by the pump 79, which itself is fully enclosed within the box. Nevertheless, the actuating mechanism for the pump, the adjustment means therefor, various removable plugs, etc., are located externally at the outer end of the box, where they are readily accessible. Likewise, by removal of plugs, all the oil conduits can be reached for cleaning, if necessary. The arrangement of the entire lubricating system is at the same time such that it leaves readily accessible the various cover plates and caps, through which the moving parts of the valve actuating mechanism can be inspected, withdrawn, and replaced.

I claim:

1. Locomotive valve actuating mechanism comprising a movable admission-valve cam shaft and moving parts associated therewith, a movable exhaust-valve cam shaft and moving parts associated therewith, actuating connections adapted to impart movements to said shafts varying with changes in locomotive operation, but a lesser average movement to one of said shafts than to the other under normal high-speed operation of the locomotive, pump means for lubricating both of said shafts and associated moving parts, and driving connections to said pump means from the shaft of greater average movement under normal high-speed operation of the locomotive.

2. For a locomotive having a cylinder and a valve chest at each end thereof extending upwardly a substantial distance therefrom, valve actuating mechanism mounted adjacent said cylinder and down in between said chests, a casing enclosing said mechanism, a force-feed lubricating system for said mechanism, and driving means for said system positioned for access from the outer lateral face of said casing.

3. For a locomotive having a cylinder and a valve chest at each end thereof, valve actuating mechanism mounted adjacent said cylinder and between said chests, a casing enclosing said mechanism, a force-feed lubricating system for said mechanism including an oil pump within said casing, driving connections between said mechanism and the pump, all of said parts being compactly disposed, and arranged for lateral removal as a unit from between said chests, and means for separately removing said pump without removing the casing and actuating mechanism.

4. For a locomotive having a cylinder and a valve chest at each end thereof, valve actuating mechanism mounted adjacent said cylinder and between said chests, a casing enclosing said mechanism, a force-feed lubricating system for said mechanism including an oil pump within said casing, and driving connections between said mechanism and the pump and located in large part outside of said casing in position for access in situ from the side of the locomotive.

5. In locomotive valve actuating mechanism or the like, a cam box enclosing cam shaft means and other moving parts adapted to operate the valves therefrom, a force-feed system for lubricating moving parts of the mechanism, including an oil sump formed integrally with the box, an oil pump housed within the box in communication with the sump, oil delivery conduits formed in the structure of the box, means for driving said pump from one of said parts, and means located exteriorly of said box for effecting various fixed adjustments of the pump feed rate.

6. In locomotive valve actuating mechanism or the like, a cam box enclosing cam shaft means and other moving parts adapted to operate the valves therefrom, a force-feed system for lubricating moving parts of the mechanism, including oil delivery lines within the box, an oil pump, driving connections including an element passing through a wall of the box for normally driving said pump from one of said moving parts within the box, and a supplementary manually operated member for driving said pump accessible from outside the box and coupled to act through said element.

7. In locomotive valve actuating mechanism or the like, a cam box of substantial vertical height enclosing superimposed cam shafts and other moving parts adapted to operate the valves therefrom, and a force-feed system for lubricating moving parts of the mechanism, including an oil sump and pump located in said box below the lower cam shaft, means for driving said pump from the lower of said shafts, and discharge lines from said pump located within said box and delivering oil above both of said shafts to the moving parts associated therewith.

8. In locomotive valve actuating mechanism or the like, a cam box of substantial vertical height enclosing superimposed cam shafts and other moving parts adapted to operate the valves therefrom, and a force-feed system for lubricating moving parts of the mechanism, including an oil sump and pump located in said box below the lower cam shaft, actuating means adapted to impart movements to said shafts varying with changes in locomotive operation, but a lesser average movement to the upper shaft than to the lower under normal high-speed operation of the locomotive, means for driving said pump from the lower of said shafts, and discharge lines from said pump delivering oil above both of said shafts to the moving parts associated therewith.

9. In locomotive valve actuating mechanism or the like, a cam box enclosing cam shaft means and other moving parts adapted to operate the valves therefrom, and a force-feed system for lubricating moving parts of the mechanism, including an oil pump driven by one of the moving parts, oil delivery lines located within the box and positioned to feed the parts to be lubricated, means for adjusting the pump feed rate for the lubricating system as a whole, and a feed regulating device in a delivery line adapted to effect a difference in flow in said line with respect to another line.

10. In a locomotive valve actuating mechanism or the like, a cam box enclosing cam shaft means and other moving parts adapted to operate the valves therefrom, a force-feed system for lubricating moving parts of the mechanism in the box, including an oil pump enclosed in said box, driving connections for actuating said pump from a moving part within the box, extending outside the box and there having a freewheeling device, and manually actuable means for actuating said pump through the freewheeling device.

11. In association with a locomotive cylinder and saddle casting having a valve chest at each end of the cylinder, a valve actuating assembly having moving parts housed within a box which is seated at the side of the saddle, on top of the cylinder and located between said chests, a sump in the lower part of said box, an oil pump unit in the box driven from one of the moving parts, and positioned to take oil from said sump and feed the same to moving parts in the box, and a strainer unit in the box in the path of flow of oil passing to the sump, and means of access to said units through the outer end wall of the box, through which said units can each be independently removed.

12. For a locomotive having a cylinder and a valve chest at each end thereof extending upwardly a substantial distance therefrom, valve actuating mechanism mounted adjacent said cylinder and down in between said chests, a casing enclosing said mechanism, driving connections coupled to said valve actuating mechanism at the inner lateral face of the casing, a force-feed lubricating system for said mechanism, and driving means for said system positioned for access from the outer lateral face of said casing.

13. The construction of claim 1 incorporating means for relative adjustment of oil delivery to the two shafts from said pump.

14. The construction of claim 1 incorporating means for relative adjustment of oil delivery to the two shafts from said pump, and means of adjustment of the total pump feed rate for a given cam shaft operating rate.

JULIUS KIRCHHOF.